United States Patent [19]

Singh et al.

[11] Patent Number: 4,992,342
[45] Date of Patent: Feb. 12, 1991

[54] STABILIZED CARBONATE FUEL CELL CATHODE

[75] Inventors: Prabhakar Singh, Bethel; Randolph M. Bernard, New Preston; Lawrence M. Paetsch, Sherman; Ronald D. Chamberlin, Brookfield, all of Conn.

[73] Assignee: Energy Research Corporation, Danbury, Conn.

[21] Appl. No.: 725,257

[22] Filed: Apr. 19, 1985

[51] Int. Cl.$^5$ .............................................. H01M 4/86
[52] U.S. Cl. ..................................... 429/44; 429/16; 429/41
[58] Field of Search ........................ 429/16, 41, 44

[56] References Cited

U.S. PATENT DOCUMENTS

| | | | |
|---|---|---|---|
| 3,505,120 | 4/1970 | Cole | 429/41 |
| 4,329,403 | 5/1982 | Baker | 429/16 X |
| 4,411,968 | 10/1983 | Reiser et al. | 429/41 |
| 4,448,857 | 5/1984 | Iacovangelo | 429/41 |
| 4,507,262 | 3/1985 | Karas et al. | 429/16 X |

FOREIGN PATENT DOCUMENTS 60-56375  4/1985  Japan.

Primary Examiner—Brian E. Hearn
Assistant Examiner—Stephen J. Kalafut
Attorney, Agent, or Firm—John J. Torrente

[57] ABSTRACT

Migration and/or dissolution of Ni from the cathode of a molten carbonate fuel cell is retarded by the incorporation of a constituent adapted to effect such retardation.

9 Claims, 4 Drawing Sheets

SEM PHOTOGRAPH OF A COMPOSITE ELECTROLYTE TILE AND A RETARDING LAYER FROM CELL 2008

EDS ANALYSIS OF COMPOSITE SHOWN IN FIG. 2

STABILIZED CARBONATE FUEL CELL CATHODE

BACKGROUND OF THE INVENTION

This invention relates to stable cathodes and, in particular, to a mechanism for retarding nickel oxide loss in the cathode of a molten carbonate fuel cell.

Cathodes for use in molten carbonate fuel cells generally employ lithiated nickel oxide as the cathode constituent. During long term operation of the fuel cell it is found that dissolution of nickel oxide and precipitation of the nickel occurs. As a result, the cathode is consumed at the cathode-electrolyte interface, thereby greatly decreasing the cathode surface area. Furthermore, nickel precipitates into the matrix increasing the likelihood that electrical shorting of the cell may occur.

In a molten carbonate fuel cell the severity of the above effects has been found to be influenced by the gas composition used, the matrix thickness, load conditions and other cell characteristics. However, to date, elimination of these effects has not been possible under normal cell operating conditions. Also, while attempts have been made to develop alternative cathode materials, satisfactory substitute materials have not as yet been found.

It is therefore a primary object of the present invention to provide a mechanism for retarding nickel loss in a nickel oxide cathode.

It is a further object of the present invention to provide a mechanism for retarding nickel dissolution and nickel precipitation in a nickel oxide cathode electrode.

SUMMARY OF THE INVENTION

In accordance with the principles of the present invention, the above and other objectives are realized by providing in the cathode and electrolyte assembly of a molten carbonate fuel cell a constituent adapted to retard nickel dissolution and/or migration from the cathode. Preferably, the retarding constituent comprises multivalent transition or alkaline earth metals and, more preferably, oxides of metals selected from the group consisting of iron, manganese, cobalt, barium and strontium.

It is also preferable, where the cathode material is lithiated nickel oxide, for the constituent oxides to also be lithiated. A preferable lithiated retarding constituent is a mixture of lithium iron oxides. A preferable mixture of such oxides is a mixture of $LiFeO_2$ and $LiFe_5O_8$.

In practice of the invention, the constituent can be incorporated into or formed as a discrete layer and the layer then situated between the cathode and electrolyte. Alternatively, the constituent may be incorporated into the cathode and/or the electrolyte as a dispersion Additionally, it may be incorporated into the electrolyte as a homogeneous saturated solution.

DESCRIPTION OF THE DRAWINGS

The above and other features and aspects of the present invention will become more apparent upon reading the following detailed description in conjunction with the accompanying drawings in which.

DETAILED DESCRIPTION

Figure 1:
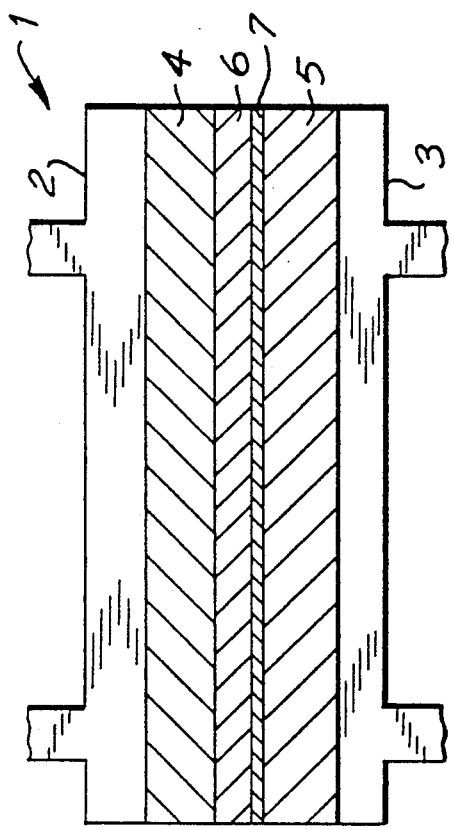
FIG. 1 shows a molten carbonate fuel cell employing a stabilizing mechanism in accordance with the principles of the present invention.

In FIG. 1, a molten carbonate fuel cell 1 includes inlet manifolds or housings 2 and 3 for coupling fuel process gas and oxidant process gas to anode and cathode electrodes 4 and 5, respectively. The anode 4 of the cell 1 typically comprises a porous nickel material. The electrolyte matrix or tile 6, on the other hand, typically comprises an alkali carbonate material and a binder which for present purposes are assumed to be lithium and potassium carbonate and lithium aluminate, respectively. Similarly, for present purposes, the cathode 5 is assumed to comprise lithiated nickel oxide of the general formulation $Li_xNi_{1-x}O$.

In accordance with the principles of the present invention, the cell 1 is further adapted so as to inhibit or retard nickel dissolution and/or migration from the cathode 5. In the present illustrative case, the latter is accomplished by providing a discrete layer 7 at the cathode-electrolyte interface. The layer 7, in turn, includes a constituent for providing the aforementioned retardation.

In accordance with the invention, a preferable constituent for the retarding layer 7 includes one or more compounds of transition or alkaline earth metals and, more preferably, one or more mixed oxides of metals selected from the group consisting of iron, manganese, cobalt, barium and strontium. It is further preferable, where the cathode is lithiated, as in the present illustrative case, for the mixed oxides to also be lithiated. An oxide which has been found usable is lithiated iron oxide having the formulation $LiFe_xO_y$ and a particular preferred mixture is $LiFeO_2$ and $LiFe_5O_8$.

A number of molten carbonate fuel cells employing a layer 7 comprised of a mixture of $LiFeO_2$ and $LiFe_5O_8$ have been constructed and operated. In all these cells, the layer 7 is fabricated by mixing $Fe_2O_3$ and $(LiK)_2CO_3$ powders in a heated atmosphere containing air and carbon dioxide. A typical temperature for the atmosphere is 650 degrees centrigrade and a typical percentage of carbon dioxide in air is 5-10 percent.

Heating of the mixed compounds in this atmosphere converts the compounds to a mixture of lithiated iron oxides having the formulation $LiFeO_2$ and $LiFe_5O_8$. This mixture is then washed, filtered, dried and ground to produce submicron size particles. The resultant particles are then tape cast to produce a continuous layer or tape of 75 to 150 micrometers thickness and pore size of 0.3 to 0.4 micrometers.

Cells are constructed using a standard anode, a standard electrolyte matrix or tile, standard anode and cathode current collectors and a standard composite lithiated NiO cathode. In constructing a cell the mixed iron oxide tape is situated at the interface between the cathode and the tile in accordance with FIG. 1.

Cells made in accordance with the above procedure were operated for 1000 hours and post examination of the electrolyte tiles of the cells showed no evidence of nickel metal precipitate either near the cathode/tile interface or near the anode/tile interface. Furthermore, cell resistance and cell voltage were found substantially unaltered by the presence of the layer. Also, retardation of the dissolution of NiO from the cathode was confirmed by independent out-of-cell solubility measurements which showed a five fold decrease in solubility of NiO.

Figure 2:
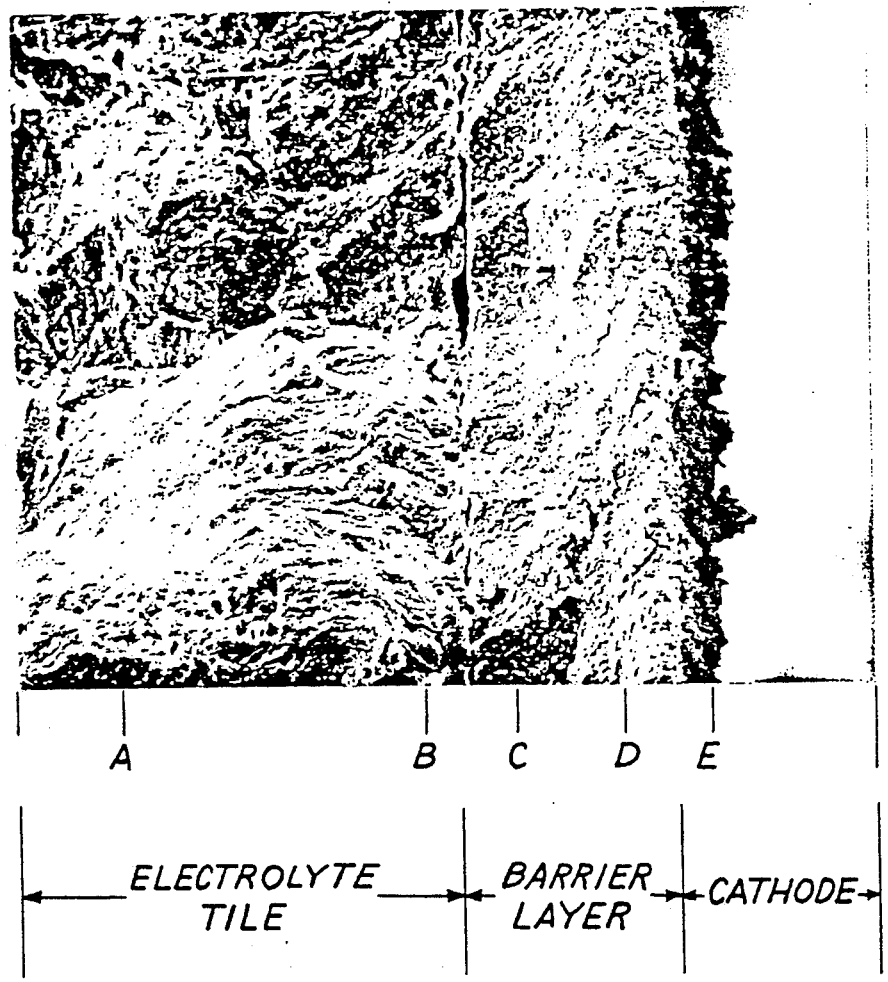
FIG. 2 shows scanning electron miscroscope photographs of the cross section of an anode-electrolyte-cathode section of a fuel cell of the type shown in FIG. 1.
Figure 3:
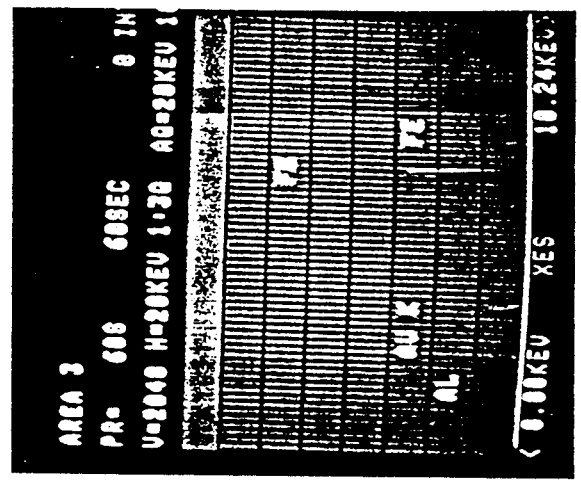
FIG. 3 illustrates energy dispersive spectroscopy photographs of various areas of the section of FIG. 2.
Figure 3:
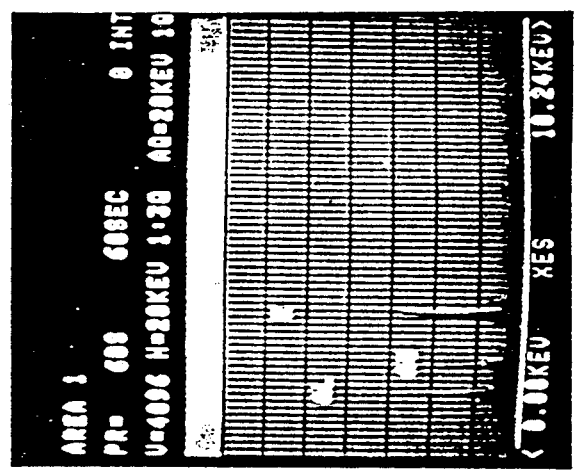
Figure 3:
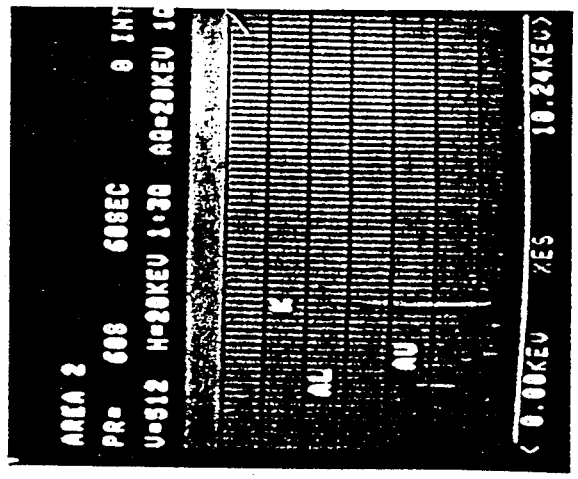
Figure 3:
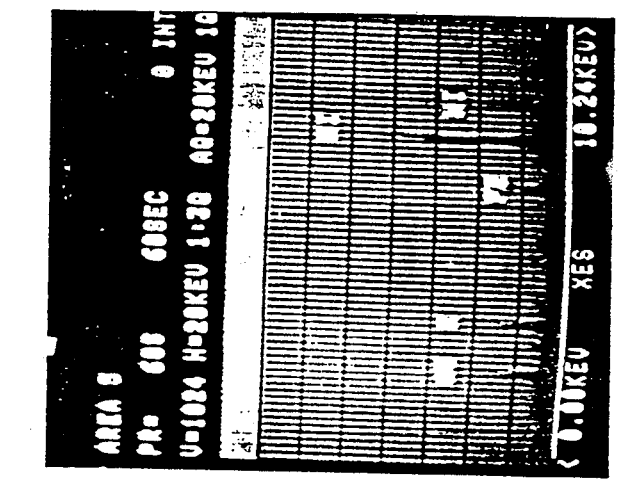
Figure 3:
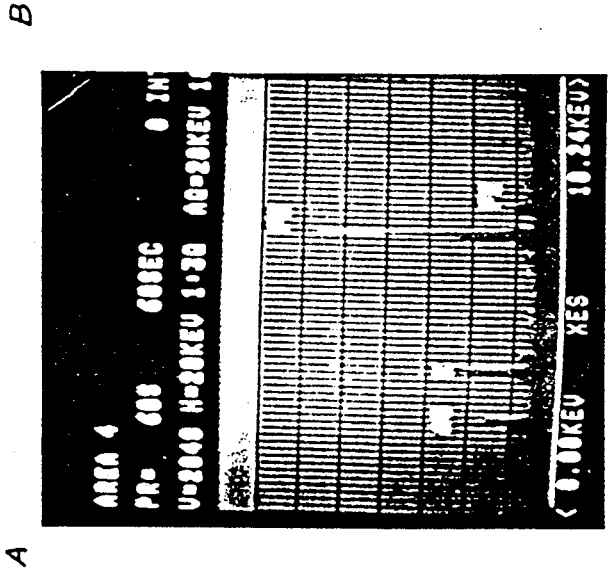

FIG. 2 shows a scanning electron microscope photograph of tile 6, retarding layer 7 and cathode 5 of cell 2-008 constructed as above described. FIG. 3 illustrates the accompanying energy dispersive spectroscopy scans for various regions of this sandwich. As can be seen from FIG. 3, no nickel or iron is present in the region A corresponding to the central area of the tile 6. Likewise, nickel and iron are absent from the region B which is the tile side of the tile-retarding layer interface. Similarly, the region C at the retarding layer side of this interface also shows no Ni. The region D of the layer close to the cathode also evidences an absence of Ni. Finally, the region E which represents a thin film of material which adheres to the retarding layer from the cathode, shows the expected Ni along with some trace of iron.

The above results aptly demonstrate the barrier or retarding action of the mixed ferrite layer 7 toward the migration of Ni. Subsequent chemical analysis of the sandwiched layers by atomic absorption found 0.8 micrograms Ni/hr/sq.cm., compared to the usual amounts in cells without the layer 7 of up to 12.

Figure 5:
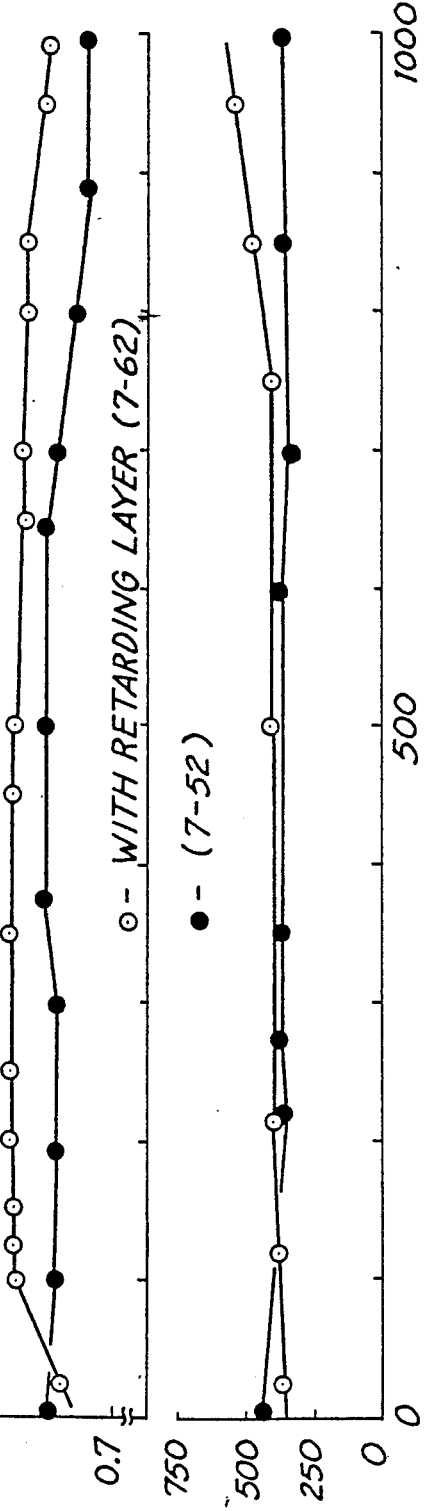
FIG. 5 illustrates the performance characteristics of the cells of FIG. 4.
Figure 4:
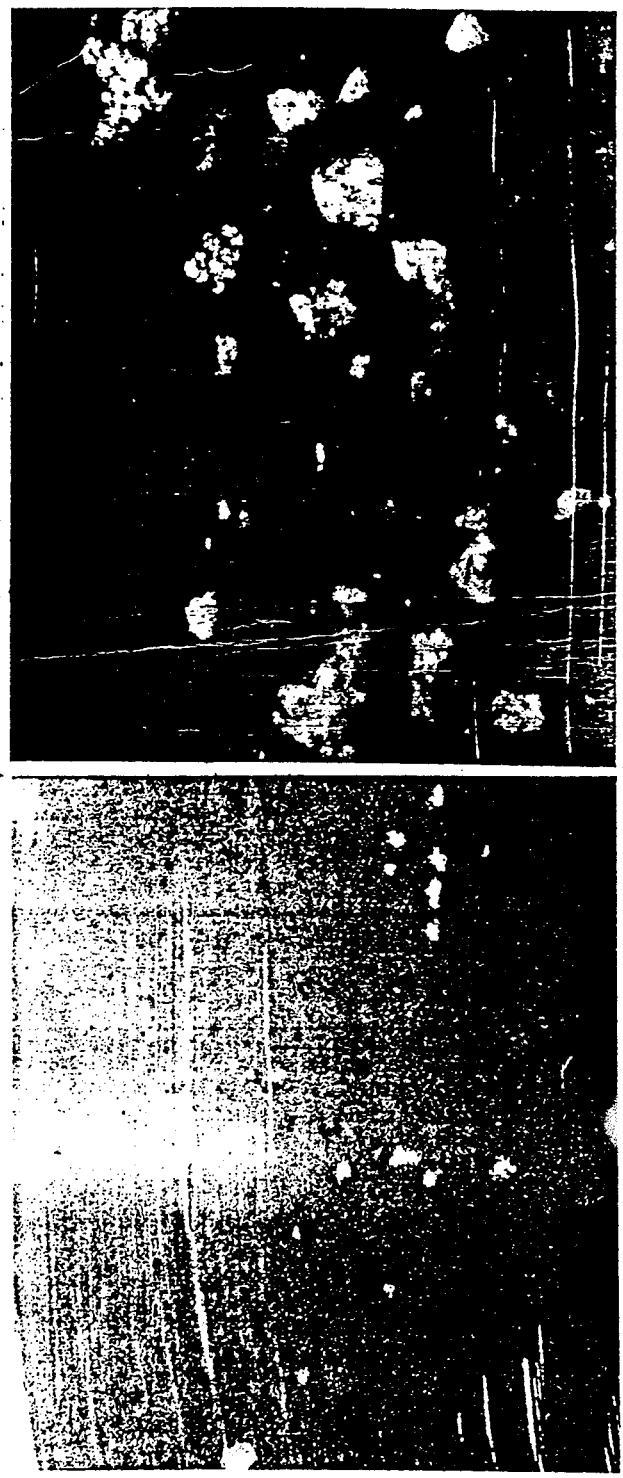
FIG. 4 sets forth a comparison of the electrolyte of a cell having the stabilizing mechanism of the invention and a standard cell.

FIG. 5 shows the performance characteristics of a cell 7-62 employing a layer in accord with the invention and a conventional cell 7-52 having similar component characteristics, but without the layer 7. FIG. 4 shows optical photographs of the cross-sections of tiles 6 of each of the cells 7-62 and 7-52.

As can be seen from FIG. 5, no performance dilution is evidenced by use of the layer 7. Also, FIG. 4 demonstrates that while Ni particles are present in each of the tiles of the cells 7-62 and 7-52, those of the tile 7-62 employing the layer 7 are of much smaller size and number. Analysis of these tiles by atomic absorption found only 0.9 micrograms Ni/hr/sq.cm. in the tile of cell 7-62, with 5.81 in the tile of cell 7-52. Again, therefore, as in the previous example, the superior Ni retardation capability of the present cells is apparent.

It should be noted that while the retarding constituent has been described and shown as forming a discrete layer, it is within the contemplation of the invention that the constituent also be incorporated into the cathode and/or the electrolyte tile. Thus, an additive comprised of the material discussed above for the layer 7 can be directly incorporated into the cathode or the electrolyte tile as a separate phase (dispersion). Additionally, the constituent may be incorporated into the electrolyte as a homogeneous, saturated solution.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A composite structure for use in a molten carbonate fuel cell comprising:
   an anode layer;
   a cathode layer comprising a nickel oxide material;
   an electrolyte layer situated between said anode and cathode layers;
   and a constituent for retarding migration and/or dissolution of said nickel-oxide constituent from said cathode, said retarding constituent comprising one or more oxides of alkaline earth metals.

2. A composite structure in accordance with claim 1 wherein:
   said constituent is in layer situated at the interface of said cathode and electrolyte layers.

3. A composite structure in accordance with claim 1 wherein:
   said layer is a discrete layer.

4. A composite structure in accordance with claim 1 wherein:
   said constituent is incorporated as a separate phase into one of said electrolyte layer and said cathode layer.

5. A composite structure in accordance with claim 4 wherein:
   said constituent is added to said cathode layer.

6. A composite structure in accordance with claim 1 wherein:
   said constituent is incorporated into said electrolyte layer as a homogeneous, saturated solution.

7. A composite structure in accordance with claim 1 wherein:
   said metals are selected from the group consisting of barium and strontium.

8. A composition structure in accordance with claim 7 wherein:
   said oxides are lithiated.

9. A composite structure in accordance with claim 8 wherein:
   said cathode comprises lithiated nickel oxide of the formula $Li_xNi_{1-x}O$.

* * * * *